May 24, 1932.    L. F. BIRD    1,860,069
MOUNTING FOR RECTIFIER PLATES
Filed July 26, 1930
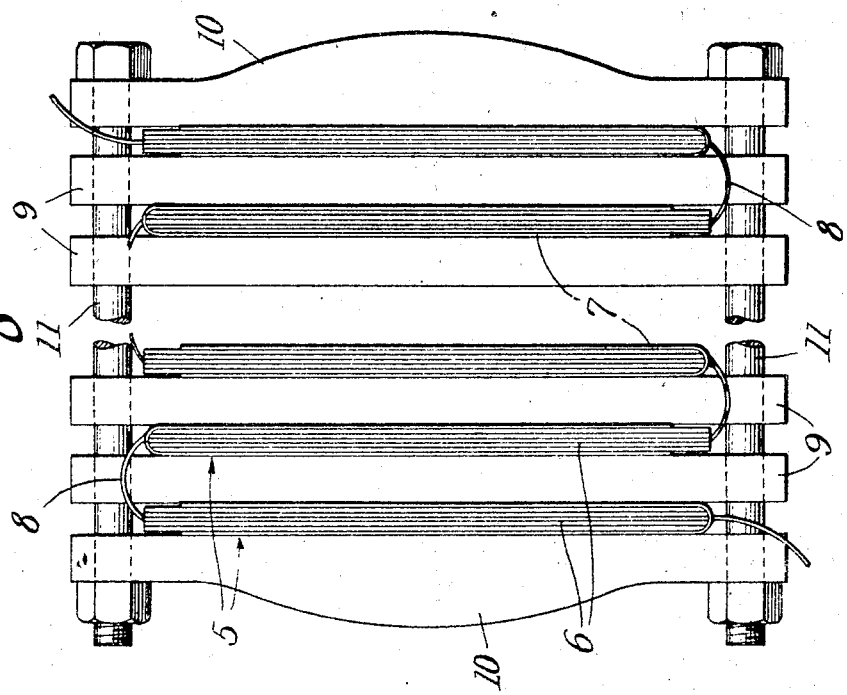
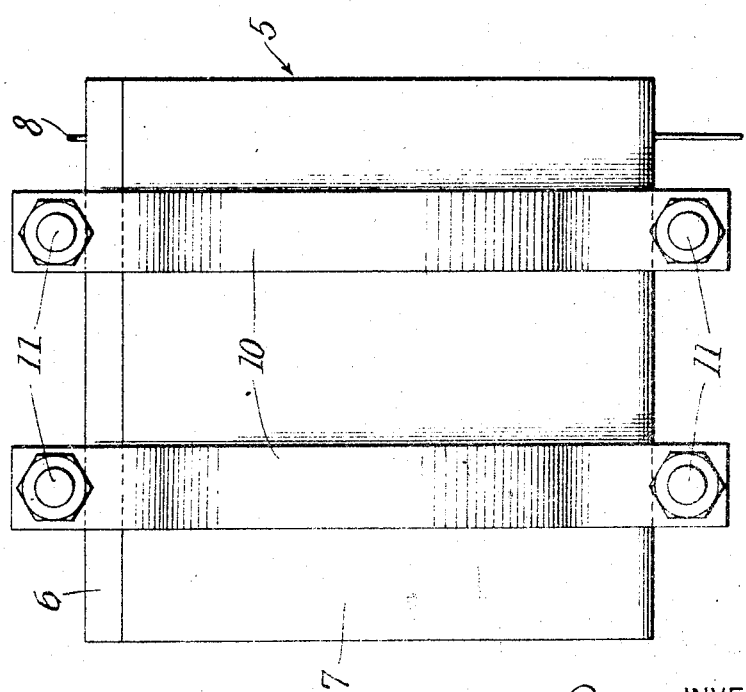
INVENTOR
Lester F. Bird
BY
Fred'k C. Fischer
ATTORNEY Patented May 24, 1932

1,860,069

UNITED STATES PATENT OFFICE

LESTER F. BIRD, OF NEWARK, NEW JERSEY, ASSIGNOR TO HANOVIA CHEMICAL AND MANUFACTURING COMPANY, OF NEWARK, NEW JERSEY, A CORPORATION OF NEW JERSEY

MOUNTING FOR RECTIFIER PLATES

Application filed July 26, 1930. Serial No. 470,952.

This invention relates to improvements in mountings for rectifier units in which the plates are spaced and suspended so that there is free circulation of air throughout the units.

The rectifier plates of the type herein considered usually consist of flat oxidized copper plates with collector plates pressed against the outside surfaces. The collector plates make contact with the oxide or a metallic film enabling the use of the rectifier plate in a circuit.

The usual method of mounting groups of these plates is to provide a bolt long enough to reach through the assembly, an insulating tube passing over the bolt.

The individual plates with the collector plates attached to their sides are assembled on the bolt with tubular spacers between the plates. The bolt is then tightened down on the plates, to hold them tightly in position. The electrical connections are then made between the collector plates and the copper in accordance with the desired method of assembly depending upon whether the plates are to be used in series or in parallel.

It is undesirable from an efficiency standpoint for rectifier plates to have a hole in them, because holes provide more edges to produce leakage currents. Moreover, such a mounting is not applicable to large plates, because it is impossible to secure sufficient strength for a good mounting with such an arrangement.

It is an object of this invention to provide a mounting for dry contact rectifier plates, by means of which the proper circulation of air is obtained.

A further object is the provision of a mounting for rectifier plates which obviates the necessity of providing holes in the plates themselves.

These and other advantageous objects, which will later appear, are accomplished by the simple and practical construction and arrangement of parts hereinafter described and exhibited in the accompanying drawings, forming part hereof, and in which:

Figure 1 represents an end view of an assembly of rectifier plates embodying the invention, and Figure 2 represents a side view of the assembly shown in Figure 1.

Referring to the drawings, the assembly is shown to include a plurality of rectifying units 5, the mother copper plate 6 of each unit being connected by a wire 8 to the collector plate 7 of the adjacent unit. The collector plates consist in sheet metal plates folded over each rectifying unit.

Each rectifying unit with its associated collector plate is separated from the adjacent unit by a pair of insulating strips 9, positioned inwardly from the ends of the units. At each end of the assembly are provided insulating end strips 10, and bolts 11 pass through apertures in the end strips 10 and the strips 9, the assembly being tightly clamped by means of nuts threaded on the bolts.

As will be seen from the above description, the plates do not have undesirable holes in them, and the collector plates are not mechanically attached to the individual rectifying units by the use of rivets, grommets, and the like. The assembly affords the maximum possible air circulation through the units since there is minimum interference with the air flow.

This feature is very important, as ample cooling is essential for satisfactory operation of a rectifying unit, as the maximum allowable temperature is definitely fixed and must not be exceeded.

My invention is applicable to any size plates but finds its chief advantage when the plates are relatively large in size. Plates that are mounted on the bolt assembly are usually of the order of 1.0 to 2.0 inches square or possibly circular with these diameters.

The plates that my invention apply to best are those from three inches square up to six inches square or even larger. It is in these sizes that the other types of mounting are unsuitable.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. An assembly for a rectifying device having a plurality of rectifying units, comprising a pair of strips of insulating material separating each unit from the adjacent unit, apertures in the ends of the strips, bolts passing through the apertures, and means on the bolts for tightly clamping the strips and units.

2. A rectifying device comprising a plurality of unilateral electrical conducting plates, pairs of strips of insulating material for spacing each plate from the adjacent plate, said strips having apertures in their ends, bolts passing through the apertures, end strips receiving the bolts, and means cooperating with the end strips and bolts to clamp the plates and spacing strips together.

3. An assembly for a rectifying device having a plurality of rectifying units, comprising strips of insulating material separating each unit from the adjacent unit, and means associated with the ends of the strips for tightly clamping the strips and units together, said means being in no way connected with the rectifying units.

This specification signed this 21st day of July, 1930.

LESTER F. BIRD.